(12) United States Patent
Laffin (10) Patent No.: US 11,338,212 B2
(45) Date of Patent: May 24, 2022

(54) PARK RIDE WITH WEIGHT PROPORTIONAL WATER BRAKING

(71) Applicant: DISNEY ENTERPRISES, INC., Burbank, CA (US)

(72) Inventor: Kristopher M. Laffin, Culver City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 535 days.

(21) Appl. No.: 16/539,538

(22) Filed: Aug. 13, 2019

(65) Prior Publication Data

US 2021/0046390 A1 Feb. 18, 2021

(51) Int. Cl.
*A63G 21/18* (2006.01)
*A63G 3/00* (2006.01)
*B61H 13/30* (2006.01)
*A63G 7/00* (2006.01)

(52) U.S. Cl.
CPC .......... *A63G 3/00* (2013.01); *A63G 7/00* (2013.01); *B61H 13/30* (2013.01)

(58) Field of Classification Search
CPC ...... A63G 21/00; A63G 21/18; A63G 31/007; A63G 3/00; A63G 7/00
USPC ..... 472/13, 117, 128–129; 104/53, 249, 250
See application file for complete search history.

(56) References Cited

U.S. PATENT DOCUMENTS

| | | | | | |
|---|---|---|---|---|---|
| 4,149,469 | A | * | 4/1979 | Bigler | A63G 3/00 104/249 |
| 5,613,443 | A | * | 3/1997 | Ariga | A63G 7/00 472/117 |
| 5,732,635 | A | * | 3/1998 | McKoy | B63B 1/16 104/73 |
| 7,430,966 | B2 | * | 10/2008 | Mabillard | A63G 7/00 104/53 |
| 2007/0199475 | A1 | * | 8/2007 | Rastegar | B61K 7/02 104/249 |

* cited by examiner

*Primary Examiner* — Kien T Nguyen
(74) *Attorney, Agent, or Firm* — Snell and Wilmer L.L.P.; Kent A. Lembke (57) ABSTRACT

A water ride including vehicles that ride on a track and using water for braking. A run-out section of the track is provided after a drop or down chute section, and the track in the run-out section runs through a pool of water at a depth causing at least a portion of a vehicle riding on the rails to contact a depth of the water to achieve vehicle braking. Significantly, the new water ride is adapted to adjust or set a variable height of the rails in the run-out chute or pool to adjust the depth of water providing water drag on a vehicle traveling through the run-out section based on the vehicle weight. A braking force is applied by the water that is proportional to vehicle weight, and the water ride may be thought of as slowing vehicles with a range of weights at about the same deceleration rate.

20 Claims, 7 Drawing Sheets

PARK RIDE WITH WEIGHT PROPORTIONAL WATER BRAKING

BACKGROUND

1. Field of the Description

The present description relates, in general, to braking of vehicles in water-based rides and attractions for theme and amusement parks, and, more particularly, the description relates to a water attraction or ride with a run-out section following a drop section or down ramp in which water braking of vehicles is provided that is proportional to the weight of the vehicle rather than being equal for all vehicles, independent of weight.

2. Relevant Background

There are numerous water-based attractions or rides in amusement, theme, water, and other parks and facilities throughout the world. These popular rides typically use a vehicle to carry riders or passengers along a ride path defined in part by flumes or chutes filled with water so the vehicle rides or floats along on water. Further, the rides typically include portions where the vehicle rides on a track or rails (e.g., two space-apart rails) with wheels contacting upper and/or side portions of the track or rails. For example, the vehicle may ride upon rails in lift sections of the ride prior to being released to float in flowing water of a flume or chute.

Figure 1:
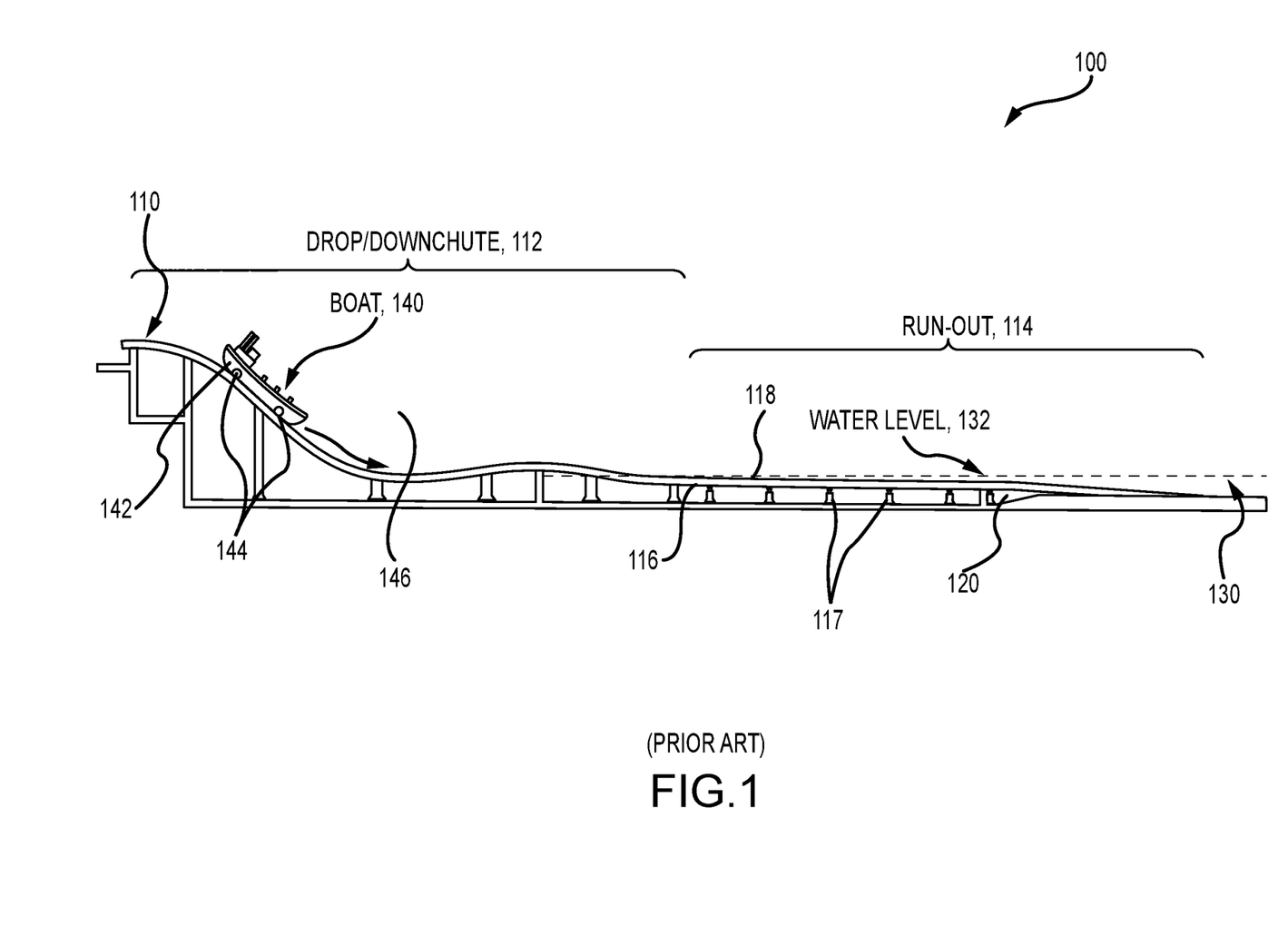
FIG. 1 illustrates a partial side view of a conventional water ride or attraction showing a drop section followed by a run-out section.
Figure 2:
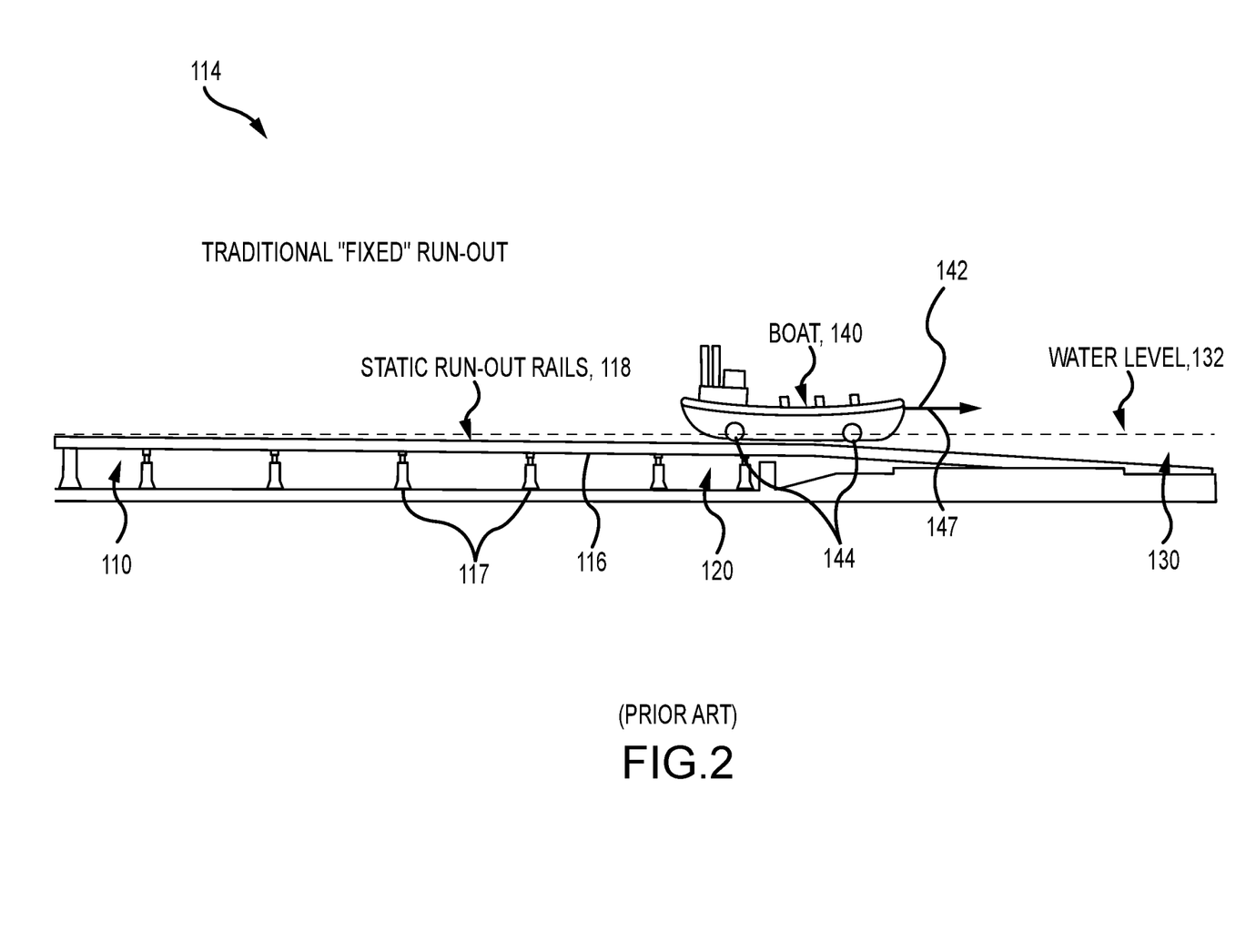
FIG. 2 is an enlarged view of the run-out section of the conventional water ride of FIG. 1 showing more detail of the components of this portion of the water ride.

Water rides that have drops or down ramps often use water to provide braking of each ride vehicle. These water rides include a section at the end of the drop or down chute that is configured to ease the vehicle into the more slowly flowing water of a more horizontal flume or chute following the drop or down chute. The section is generally known as the "runout" or runout section of the water ride. FIGS. 1 and 2 illustrate a conventional water ride 100 with a track or rails 110 defining a ride path for a vehicle or boat 140, which has a passenger compartment 142 for passengers or riders (not shown) upon which are mounted a set of wheels 144 for riding on the rails 110 when the vehicle 140 is moving 146 down the drop and not floating on water of the ride 132.

As shown, the water ride 100 includes a track or length of rails 110 with a drop or down chute section 112 followed by a run-out section 114. The drop or down chute section 112 may include a chute defined by a base and sidewalls (not shown) in which flowing water is provided, and, due to the more vertical nature or steepness of the section 112, the vehicle 140 moves relatively rapidly with the flowing or falling water and/or on the rails or track (e.g., toward the end of the down chute section 112). The run-out section 114 of the track 110 includes static run-out rails 116 with contact surfaces 118 that contact or support the wheels 144 of the vehicle 140. Hence, the run-out section 114 provides a guide track with rails 118 the vehicle 140 is riding upon similar to a vehicle in a roller coaster. The rails 116 are "static" or fixed because they are rigidly supported by vertical support members that are stationary or fixed in place.

The static rails 116 are located in a pool or chute 120 (defined by a base or floor and sidewalls (not shown in FIGS. 1 and 2)) in which a volume of water 130 is provided. The contact surfaces 118 of the rails 116 are typically located under an upper or top surface 132 of the water 130 in the pool/run-out chute 120. During operations, the boat or vehicle 140 moves 147 through the run-out section 114 being initially supported by the rails 116 with its wheels 144 rolling against the contact surfaces and later floating upon the water 130, as the rails 116 angle down towards the bottom of the flume, e.g., when the depth of the water 130 in the pool 120 (as measured between the contact surfaces or top 118 of rails 116 and the top surface 132 of the water is great enough to lift or float the boat 140 off the rails 116. The runout 114 is designed to ease the vehicle 140 into the water 130, by providing braking or velocity trimming, in a controlled manner to ensure a specific deceleration is met as well as to control splash. When the vehicle 140 reaches the end of the run-out rails 116, the track 110 transitions down further to allow the boat or vehicle 140 to float off the rails 116 and continue along the pool or flume/chute 120 of the ride 100.

The run-out section is often optimized for a vehicle that is loaded with the maximum capacity of passenger weight. This approach is chosen to ensure that a maximum weight vehicle on a ride does not travel too fast upon exiting the run-out section. For example, it is desirable that this maximum weight vehicle is slowed or braked to a predefined maximum speed by the end of the run-out section of the ride to not hit a downstream curve too fast as this could cause high G-forces on the passengers. The predefined maximum speed for the maximum weight vehicle may also be chosen to avoid hydroplaning or possible derailment of the vehicle.

Braking and speed control are provided in the run-out section by using the run-out section of track or its rails to control the depth of water the maximum weight boat runs through to ensure there is enough water in front of the boat to trim its speed or brake it. One problem with this approach is that, since the run-out section of track is optimized for a maximum weight vehicle and the run-out section of track is locked in place or is static, the amount of drag or braking caused by the water in the run-out section pool or chute is constant for all vehicle or boat loading conditions. As a result, a vehicle that is less loaded, such as an empty vehicle or with less than the maximum number (or weight) of passengers, will be slowed much more quickly (and even stopped) and in a shorter distance than the maximum loaded vehicle, as noted by Newton's Second Law of Motion (F=ma) because the force (F and braking force on the vehicle) remains constant for varying masses (m) of ride vehicles causing acceleration (a) to vary proportionately with mass or weight of the vehicles.

Use of a single or constant braking force in conventional water rides causes a number of water ride operational challenges. For example, a single brake force causes issues with attraction or ride efficiency as the empty or lighter vehicle, which decelerates faster due to the water drag, now moves at a much slower rate for the entire length of the run-out section. The maximum loaded vehicle, in contrast, continues to move at a higher rate of speed until it reaches the end of the run-out section of track per the design specifications for conventional water ride. Hence, it takes longer for lighter vehicles to traverse the drop and run-out sections, and a heavier vehicle behind the lighter vehicle can catch up, which may lead to vehicle-to-vehicle bumping, passenger discomfort, and decreased ride quality. In some cases, the lighter vehicle will not traverse the length of the run-out section within a predefined dispatch interval for the water ride (e.g., as determined by a vehicle proximity sensor positioned at the end or exit of the run-out section), and the ride's control system will be forced to hold an upstream vehicle upstream from the drop section, to prevent a chance of a collision, until the lighter vehicle is clear of the run-out. This undesirable situation can create a cascade that can propagate through the water attraction, which reduces efficiency, attraction capacity, and show quality.

In summary, conventional water attractions or rides use a run-out or braking section that only provides a single brake force (or amount of water drag). Ride designers and operators are forced to try to optimize the single brake force for both heavy and light vehicles, but, to date, their efforts have often fallen short of expectations or desired operations, which has led to less efficient water attractions or rides. Hence, there remains a demand for an improved ride design that provides braking for vehicles in a water ride downstream from drops or down-chute portions of the ride or attraction. Preferably, the new braking or speed control approach would provide more consistent or equal slowing of all vehicles regardless of their weights or passenger loading, which would increase the capacity and efficiency of any water ride or attraction that makes use of the new braking or speed control approach.

SUMMARY

In brief, a water ride or attraction is provided that includes vehicles that ride on a track, which may be formed of one, two, or more rails, and that also uses water for braking. In one embodiment, a run-out section of the track is provided after a drop or down chute section, and the track in the run-out section runs through a chute or pool of water at a depth that causes at least a portion of a vehicle riding on the rails to contact a depth of the water to cause vehicle braking. Significantly, the new water ride is adapted to adjust or set the height of the rails in the run-out chute or pool to adjust the depth of water providing braking or water drag on a vehicle traveling through the run-out section based on the vehicle weight. In this manner, instead of a single braking or drag force being applied by the water, a braking or drag force is applied by the water in the pool that is proportional to the vehicle weight, and the water ride or attraction may be thought of as including weight proportional drag rate run-out rails that slow vehicles with a range of weights (e.g., from a lightest to a heaviest expected vehicle for a ride) at about the same deceleration rate and, therefore, distance.

More particularly, a park ride system is provided that generates water-based braking of vehicles based on vehicle weight. The ride or attraction includes a vehicle configured for receiving one or more passengers. A track is provided with a drop section and a run-out section, and the track defines a ride path for the vehicle through the park ride first through the drop section and second through the run-out section. The ride or attraction also includes a pool with a base and sidewalls defining a space for receiving water. The track in the run-out section includes at least one rail extending a distance through the pool along a direction of travel for the vehicle. Further, the vehicle includes rotatable wheels engaging a contact surface of the at least one rail when the vehicle travels through the run-out section. To achieve weight-proportional water drag, the run-out section comprises means for adjusting, in a manner proportional to a total weight of the vehicle, a height of the contact surface of the at least one rail relative to the base of the pool to set a depth of the water applying water drag to the vehicle.

In some embodiments, the adjusting means is active and includes a plurality of actuatable support components supporting the at least one rail. It further includes a run-out section controller transmitting control signals to initiate operation of the plurality of actuatable support components to vertically move the at least one rail to set the height of the contact surface. The adjusting means further includes a vehicle weight sensor sensing the total weight of the vehicle. During ride operations, the run-out section controller generates the control signals based on the total weight sensed by the vehicle weight sensor.

In other embodiments, the adjusting means adjusts the height of the contact surface passively in response to the vehicle being positioned on the at least one rail in the run-out section. In such embodiments, the adjusting means may include a plurality of spring members disposed between vertical track supports in the pool and the at least one rail. The plurality of spring members may be configured to have one or more spring rates providing the adjusting of the height of the top surface in the manner proportional to the total weight of the passenger vehicle. The water drag applied in the manner proportional to the total weight can be within a predefined range to provide a deceleration rate in a predefined range, and the deceleration rate may be substantially equal for the vehicle over a range of values for the total weight. In some useful cases, the spring members each comprises a metal coil spring or a gas shock.

In the same or other embodiments, the height is set to a nominal height when the vehicle is unloaded. The depth of the water with the contact surface of the at least rail at the nominal height provides a magnitude of the water drag to achieve at least a predefined minimum amount of deceleration of the vehicle in the run-out section. Further, the height is set to a minimum height when the vehicle is loaded with a predefined maximum load such that the depth of the water with the contact surface of the at least one rail at the minimum height provides a magnitude of the water drat go achieve at least the predefined minimum amount of deceleration of the vehicle in the run-out section.

DETAILED DESCRIPTION

Briefly, a water ride or attraction is described herein that includes a run-out section specially adapted to provide weight proportional drag or braking rates for more efficiently controlling the speed of varying weight vehicles (e.g., passenger boats or the like). The inventor recognized that prior run-out sections with fixed or static run-out rails (or run-out track) are problematic as they only provide one brake force or water drag rate for vehicles of all weights in the conventional water ride, which causes slowing of the boats to differing amounts and/or at differing deceleration rates. To address this problem, the new run-out section is configured to provide different drag rates (or braking forces) with water in the run-out pool or flume/chute based on the total weight of the vehicle. Stated differently, the run-out section may be adapted to passively or actively vary the water drag force depending on the vehicle loading condition.

The proposed weight proportional drag run-out changes (when desired or needed) the drag force one each passenger vehicle by varying the depth of the run-out track (e.g., its rails) depending on the total weight of the vehicle. Drag force ($F_D$) is a function of the square of the velocity (V) of an object such as a moving vehicle, the density ($\rho$) of the fluid it is moving through, the drag coefficient ($C_D$), and most importantly (with regard to design of the new water ride or attraction), the cross-sectional area (A) of the vehicle perpendicular to the velocity vector of the vehicle. Hence, the drag force equation can be given as: $F_D = \frac{1}{2} \rho V^2 C_D A$. From this equation, it can be understood that the drag force, $F_D$, is directly proportional to the cross-sectional area (A) of the boat or vehicle in the direction of its travel in the run-out pool or chute/flume.

The inventor further recognized that there are two components to cross-sectional area of a vehicle or boat moving through the water of the run-out pool or chute/flume. The first component is the width of the front or forward end of the vehicle or boat, and this will not vary with weight loaded into the vehicle or boat with most vehicle designs. The second component of vehicle cross-sectional area is the depth the vehicle or boat sits in the water, which is also known as the vehicle or boat "draft." The laws of buoyancy dictate that a heavier boat will displace more water to reach equilibrium or a floating state when compared with a lighter boat. Hence, for a water ride, a boat or vehicle loaded with passengers (e.g., 1-to-many) will sit lower in the water than a boat with no passengers (or at least with less weight) so that it will have a larger draft than the lighter boat.

Because only the draft component of the boat or vehicle is varying with vehicle weight and because the drag force is proportional to the cross-sectional area, the inventor understood that the boat draft (and, therefore, the vehicle weight) must also be directly proportional to the drag force. Hence, the new run-out section is designed to vary the draft of the vehicle or boat based on weight so as to vary the drag force. In order to vary the draft of the vehicle in the run-out section in a manner that is proportional to vehicle weight, the rails in the run-out section of the ride track are supported so as to be adjusted for each vehicle depending on its loaded weight. Instead of statically mounting the run-out rails, the new run-out section is configured to provide support for the rails that actively or passively varies the height of the contact surfaces of the rails in the run-out pool or flume/chute based on vehicle weight to provide a greater water depth for heavier vehicles than for lighter vehicles.

In a typical passive varying rail height embodiment, the run-out rails are mounted on vertical track supports that each includes a spring element or member provided between the rail and the top portion of a rigid support body. The spring element or member may take the form of nearly any useful assembly or device providing flex and having a known spring rate such as a metal coil spring, an air spring, a gas shock, and the like. The spring element or member is pre-loaded to position the rails at a height or nominal (or "at rest") position to achieve a desired water depth and, therefore, drag force for a lightest expected vehicle (e.g., an empty passenger vehicle) that will provide a desired rate of deceleration or amount of braking over the length of the run-out section.

The spring rate of the spring elements or members is chosen so they will compress an amount or distance to vary the height of the contact surfaces of the rails (and, hence, the water depth at which the vehicle sits) that is proportional to the vehicle weight so as to achieve substantially equal deceleration rates in the run-out section by applying increasingly large drag forces on heavier vehicles. With the run-out rails (or run-out section of track) supported on springs or spring elements, the lighter boats or vehicles compress the springs/sprint elements less and move the rails down in a water depth less than heavier boats or vehicles. This variance in rail movement allows the heavier boats or vehicles to sit in the water of the run-out pool or flume deeper as they traverse the run-out section to as to expose a larger area on the vehicle's surface to the water, which, as noted before, is directly proportional to boat drag force. The proportional drag being applied to the vehicles or boats of the water ride including the new run-out section mean that the accelerations (or decelerations) between varying loaded boats is much closer (and ideally equal), thereby eliminating (or nearly so) the stopping distance differential between vehicles or boats of the water ride.

Figure 3:
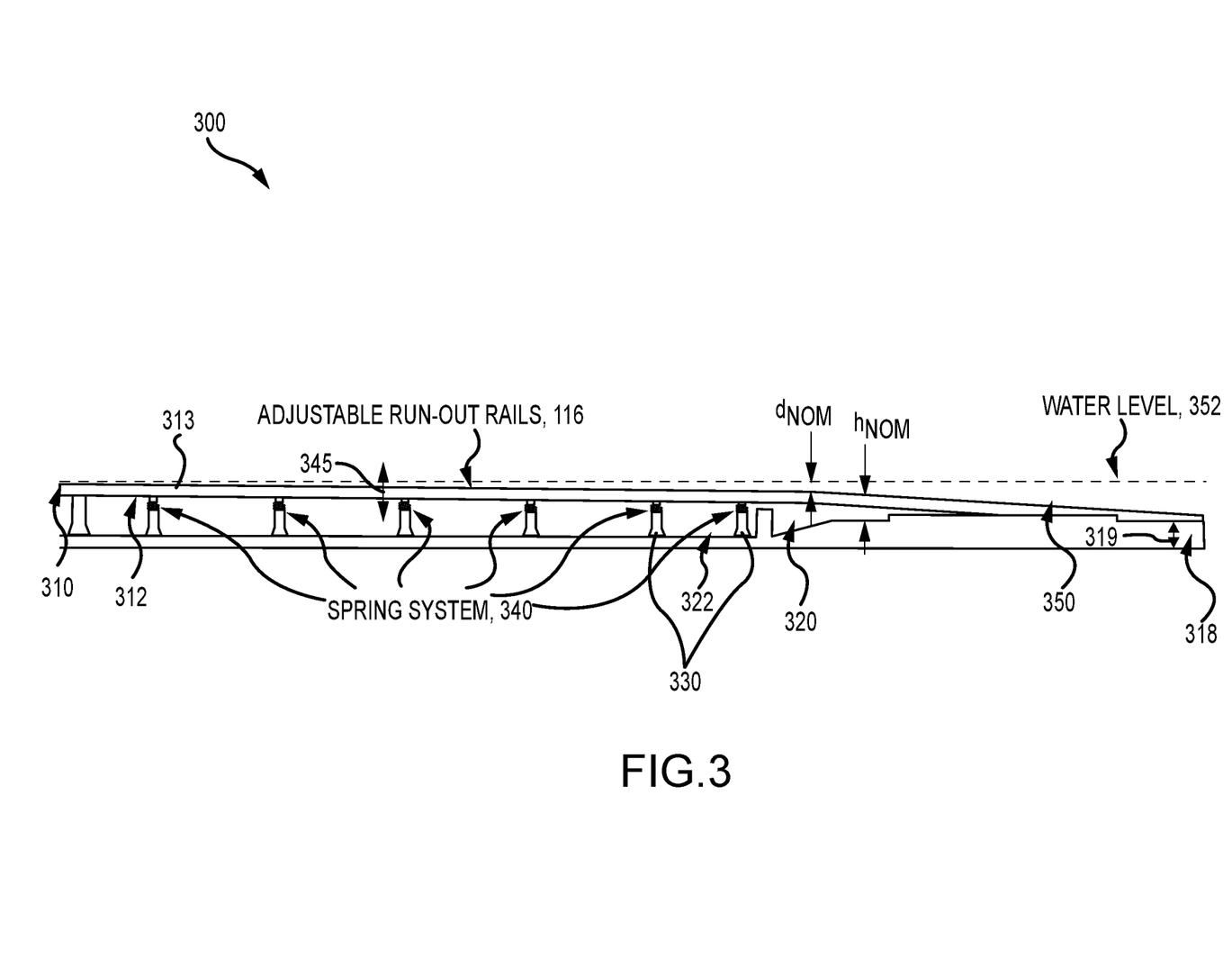
FIG. 3 is a side view of a run-out section for inclusion in a new water ride or attraction of the present description prior to loading or use by a vehicle.

FIG. 3 is a side view of a run-out section 300 of a track 310 defining a ride path in a new water ride or attraction, such as one achieved by modifying the ride 100 of FIG. 1 to replace conventional and static run-out section 114 with run-out section 300. The run-out section 300 is illustrated in its unloaded or at-rest state, e.g., prior to loading or use by a vehicle (not shown in FIG. 3 but shown in FIGS. 4 and 5).

As shown, the track 310 is formed of two (or more) rails 312 (e.g., two spaced-apart rails as is common for water and coaster-type rides) configured with a top or contact surface (s) 313 facing upward and adapted to receive wheels of a vehicle/boat used in the water ride/attraction that includes the run-out section 300. The rails 312 may include a generally horizontal first portion, which may be split into individual sections to allow the track sections to pivot with the springs, where a vehicle from a drop or down chute section would first contact the track 310 and a second portion that is angled downward toward an end of the rails 312, and the end 318 of the rails 312 may be pivotally supported as shown with arrows 319 to facilitate vertical movement of the rails 312 as shown with arrows 345, i.e., vertically downward upon loading by a vehicle and vertically upward after loading is removed (i.e., vehicle moves downstream and off of the run-out section 300).

Significantly, the movement 345 of the rail 312 is achieved by supporting the rail 312 in a non-static manner with a spring system or assembly, which is adapted to be compressed from the unloaded or preload state shown in FIG. 3 to allow a predefined amount of movement 345 of the top or contact surface 313 (e.g., one-to-many millimeters with some embodiments allowing movement 345 in the range of 75 to 200 millimeters). The spring system or assembly is formed of one-to-many spring members or elements each mated with the rail 312, e.g., a lower surface or portion of the rail's body, such that the rail 312 is supported on a bed of spring members or elements.

In the example shown, the spring assembly includes spring members or elements 340 each mated to a top of a vertical and rigid support or support member 330, which is, in turn, mounted to or coupled to the base 322 of the pool or flume 320 in which the track 310 is run or positioned. The pool or flume 320 would further include sidewalls (not shown) to define an open space for receipt of a volume of water 350 to provide a depth such that the surface or top 352 of the water 350 is above the top or contact surface 313 of the rail 312. FIG. 3 illustrates the rail 312 in its unloaded/preload state with the top 313 of the rail 312 at a nominal or preload height, $h_{Nom}$, which provides a nominal or preload depth, $d_{Nom}$, of the water 350 above the contact or top surface 313 of the rail 312, and, upon loading (e.g., with a vehicle), the height is decreased and the depth is increased based on the magnitude of the vertical movement 345 of the rail 312.

The increase in the depth of the water 350 increases the amount of water 350 that contacts a vehicle traveling through the run-out section 300, thereby increasing the water drag (and rate of deceleration). Preferably, the spring members or elements 340 are chosen to have a desired spring rate to cause the movement 345 to be based on or proportional to the weight of each vehicle traveling on the rails 312. Specifically, it is desirable for lighter boats (e.g., empty or those with one to several (but less than full capacity) passengers) to cause less movement 345 than heavier boats and to specifically achieve water depths that provide water drag on the differently loaded boats that achieves an equal deceleration through the run-out section 300 (or a deceleration rate that falls within an acceptable range (e.g., plus or minus 10 percent of a goal or target braking or deceleration rate)). The spring members or elements 340 may be metal coil springs or other spring designs, air or gas shocks, and so on to provide the desired spring rate values at each vertical support 330 (and/or along the length of the run-out section 300 or for a portion thereof, in some cases).

The preloaded or unloaded state 300 is configured to provide a desired deceleration rate for or braking or drag force being applied to a lightest expected vehicle/boat for the ride including the run-out section 300. Particularly, with a known depth for water 350 in the pool or flume 320, the height, $h_{Nom}$, for the top 313 of the rail 312 is chosen to provide a nominal depth, $d_{Nom}$, of water 350 over the rail 312 to provide the desired braking or drag force on this lightest vehicle/boat, which typically may be an empty vehicle/boat (e.g., a vehicle/boat with no passengers loaded therein). To this end, the spring members or elements are chosen to have a configuration including a preload compression (e.g., supporting only the rail 312 itself) to set the location of the top or contact surface 313 of the rail 312 (and nominal height, $h_{Nom}$).

The spring elements/members 340 are further chosen to have a design and/or configuration (e.g., with a desired spring rate or the like) to be compressed proportionally with vehicle weight (loading) to cause the rail height to also decrease until it reaches a minimum value that defines a maximum water depth, $d_{max}$, chosen to properly slow or decelerate the heaviest vehicle/boat expected in the run-out section (e.g., a vehicle/boat with the maximum allowed passenger weight). Further, one or more stop components may be provided (not shown but understood by those in the arts) to limit travel 345 of the rail 312 to the minimum value of the rail height, e.g., to account for an overloaded vehicle.

Figure 4:
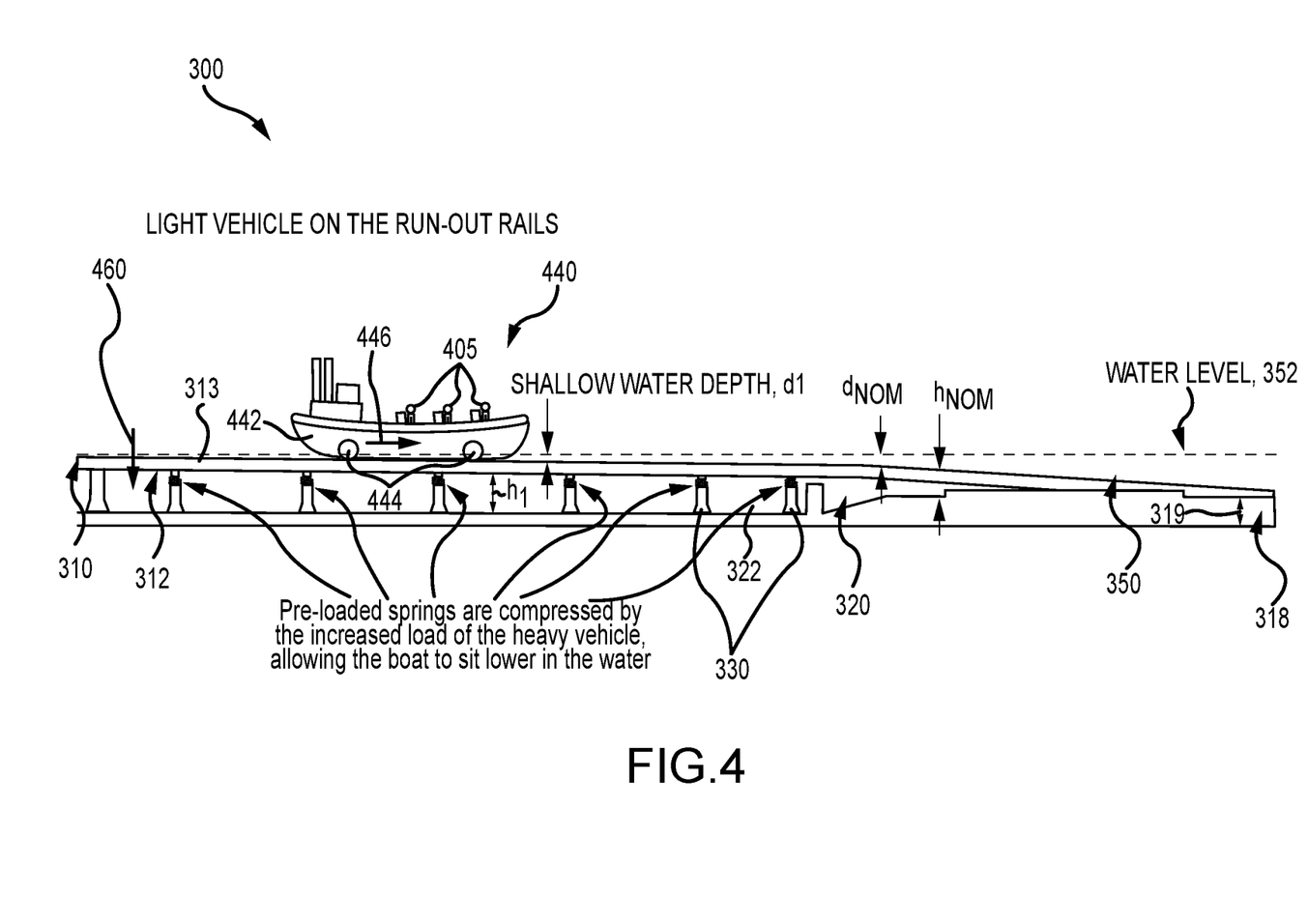
FIG. 4 is a side view of the run-out section of FIG. 3 during its use to decelerate a lightly loaded vehicle or boat.

FIG. 4 is a side view of the run-out section 300 of FIG. 3 during its use to decelerate a lightly loaded vehicle or boat 440. As shown, the vehicle 440 includes a body 442 adapted to seat one or more passengers. Also, the vehicle 440 includes wheels 444 that ride on the top or contact surface 313 of the rails 312 as the vehicle 440 moves, as shown with arrow 446, through the run-out section 300. The vehicle 440 is lightly loaded, such as with a single passenger 405 as shown, and its total weight is relatively small or light compared with a maximum allowed loaded weight for the ride vehicle 440. Hence, to decelerate the vehicle 440 at a desired rate (or in a deceleration rate range), the spring elements 340 are adapted to only compress a small amount to allow a small amount of downward movement 460 of the rail 312. This reduces the height, $h_1$, of the rail 312 when compared with the nominal or preload height, $h_{Nom}$, and, concurrently, increases the depth, $d_1$, of the water 350 above the contact or top surface when compared with the nominal or preload water depth, $d_{Nom}$. The depth, $d_1$, of the water 350 defines the amount of water drag provided in the run-out section 300, and, with a lightly loaded vehicle 440, it desirable for the water drag to be greater than that provided at a nominal water depth, $d_{Nom}$, (i.e., an increase that is proportional to the total weight of the vehicle 440 with passenger 405 relative to the total weight of the unloaded/empty vehicle 440).

Figure 5:
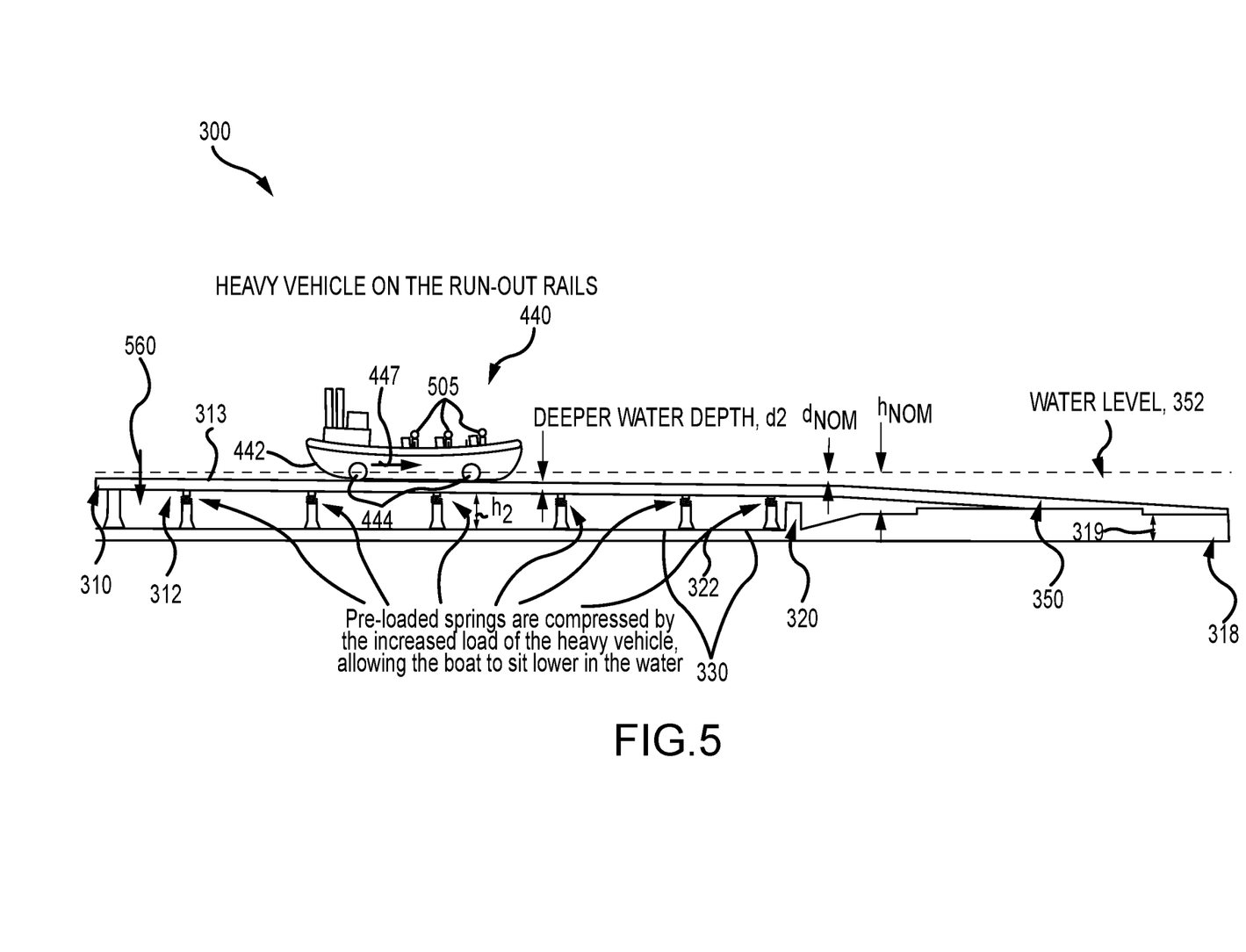
FIG. 5 is a side view of the run-out section of FIG. 3 during its use to decelerate a vehicle or boat that is more heavily loaded than the one in FIG. 4.

FIG. 5 is a side view of the run-out section 300 of FIGS. 3 and 4 during its use to decelerate a heavily loaded vehicle or boat 440 (i.e., one that is loaded with more/heavier passengers than in FIG. 3). The vehicle/boat 440 has three passengers 505 rather than one passenger 405, and these passengers 505 weigh more than passenger 405 such that the vehicle/boat 440 has a total weight (weight of the unloaded vehicle/boat plus passenger and any other loading) is greater than that during the use shown in FIG. 4. To decelerate the vehicle 440 with passengers 505 at a desired rate (or in a deceleration rate range) matching or being close (e.g., plus or minus 10 percent) to that provided during the lightly loaded use case of FIG. 4, the spring elements 340 are adapted, with a spring rate, to compress a greater amount under the more heavily loaded vehicle 440 to allow a greater amount of downward movement 560 of the rail 312. This reduces the height, $h_2$, of the rail 312 when compared with the nominal or preload height, $h_{Nom}$, and compared with the height, $h_1$, under the lighter load in the FIG. 4 use case and, concurrently, increases the depth, $d_2$, of the water 350 above the contact or top surface when compared with the nominal or preload water depth, $d_{Nom}$, and with the depth, $d_1$, of the lighter vehicle load case of FIG. 4. The depth, $d_2$, of the water 350 defines the amount of water drag provided in the run-out section 300, and, with a more heavily loaded vehicle 440 with more passengers (more weight) than the use case of FIG. 4, it desirable for the water drag to be greater than that provided at the lighter load case depth, $d_1$ (i.e., an increase that is proportional to the total weight of the vehicle 440 with passenger 405 relative to the total weight of the unloaded/empty vehicle 440 and relative to the total weight of the vehicle 440 with passenger 405).

Figure 6:
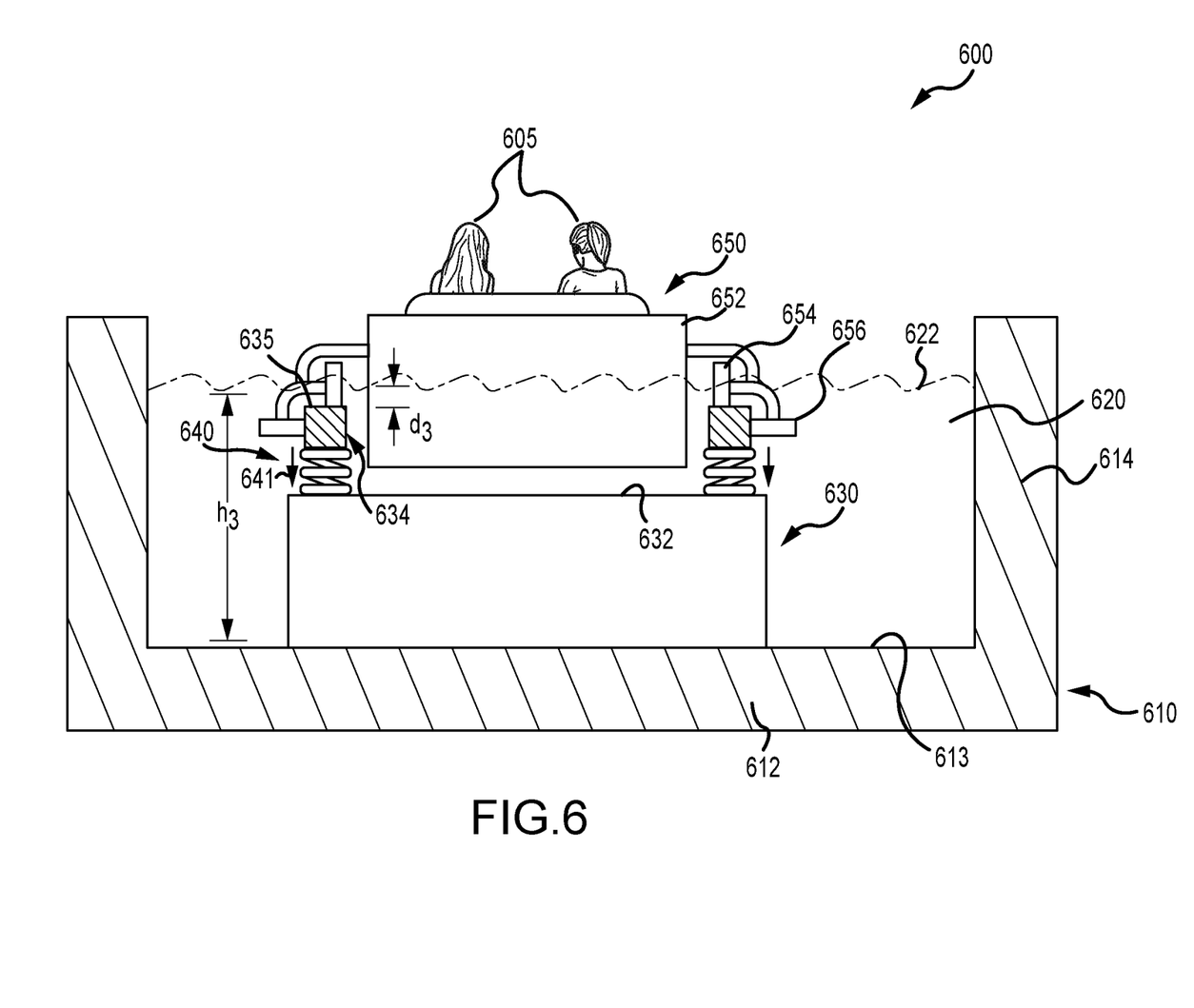
FIG. 6 is sectional view of a run-out section showing a vehicle traveling through a pool or flume filled water upon rails supported by spring members.

FIG. 6 is sectional view of a run-out section 600 of a water ride or attraction (e.g., ride 100 modified to include the run-out section 600 in place of static section 114). FIG. 6 shows a vehicle 650 traveling through a pool or flume 610 filled with water 620. The vehicle 650 includes a body 652 (boat-like design in some cases) adapted to seat one or more passengers 605 (with two shown as an example of relatively light loading), and the total weight of the vehicle 650 is defined by the vehicle's empty or unloaded weight combined with the weight of all the passengers 605 (and any other items loaded into the body 650 by the passengers 605 or ride operators).

The body 652 may be configured to float in water 620 when it reaches a certain depth above any supporting components (e.g., above track defined by rails 634) and to also roll upon a track defined by two (or more) rails 634. To this end, the vehicle 650 may include bogie assemblies on each side with load wheels 654 (mounted for free rolling) that ride on a top or contact surface 635 of one of the rails 634 and with side guide wheels 656 (also mounted for free rolling) that may contact side portions of the rails 634 to restrain side-to-side movement of the vehicle 650 (e.g., to guide it to follow the ride path defined by a track with rails 634). The pool or flume (or chute) 610 of the run-out section 600 is formed of a base 612 with an upper surface 613 and a pair of sidewalls 614, and these components 612 and 613 are designed to contain a volume of the water 620 to provide a known depth (or a depth within an operating range) as measured from the upper surface 613 to the top surface 622 of the water.

The track of the ride/attraction in the run-out section 600 includes the rails 634, which are supported upon a plurality of vertical and rigid (or static) track supports or support members 630 (with one shown from this end view) that are mated to the upper surface 613 of the base 612 of the pool 610 (but other rail support members and configurations may be used to implement the run-out section 600). Significantly, the rails 634 are not statically or rigidly coupled to the vertical track supports as in prior run-out sections. Instead, spring members or elements 640 are disposed (or sandwiched) between an upper surface or portion 632 of the vertical track support 630 and the rails 634 (e.g., a bottom surface or portion of the rails 634). As shown, the spring members 640 take the form of a metal coil spring, but many other resilient members and/or materials may be used to implement the run-out section 600 such as air or gas shocks and so on.

Arrow 641 shows that the spring member or element 640 is configured to be compressed some distance from its preloaded or "at rest" state (e.g., when only loaded by or only supporting a rail 634) as the vehicle 650 and its total weight moves onto the rail 634 (or a section of the rail 634 vertically supported by each spring member 640). This compression amount is based on the total weight of the vehicle 650, and the compression acts to move the top or contact surface 635 of the rail 634 vertically downward toward the upper surface 613 of the base 612 of the pool or flume 610. The rail movement modifies (e.g., reduces) the height of the top or contact surface of the rail 634 from a nominal height, $h_{Nom}$, that exists then there is no vehicle present in the run-out section 600, to a new vehicle-loaded height, $h_3$. The spring rate of the spring member 640 is chosen so that the amount of compression by the vehicle 650 with its load (of passengers 605) provides a water depth, $d_3$, that achieves a desired water drag (or drag or braking force in a preset range) on the vehicle 650 (e.g., exposes a desired surface area on the front of the body 652 to the water 620). With the use of the spring members 640, the depth, $d_3$, of water 620 above the rail 634 varies proportionately with total weight of the vehicle 650 such that the water drag is also proportional to this total weight.

Figure 7:
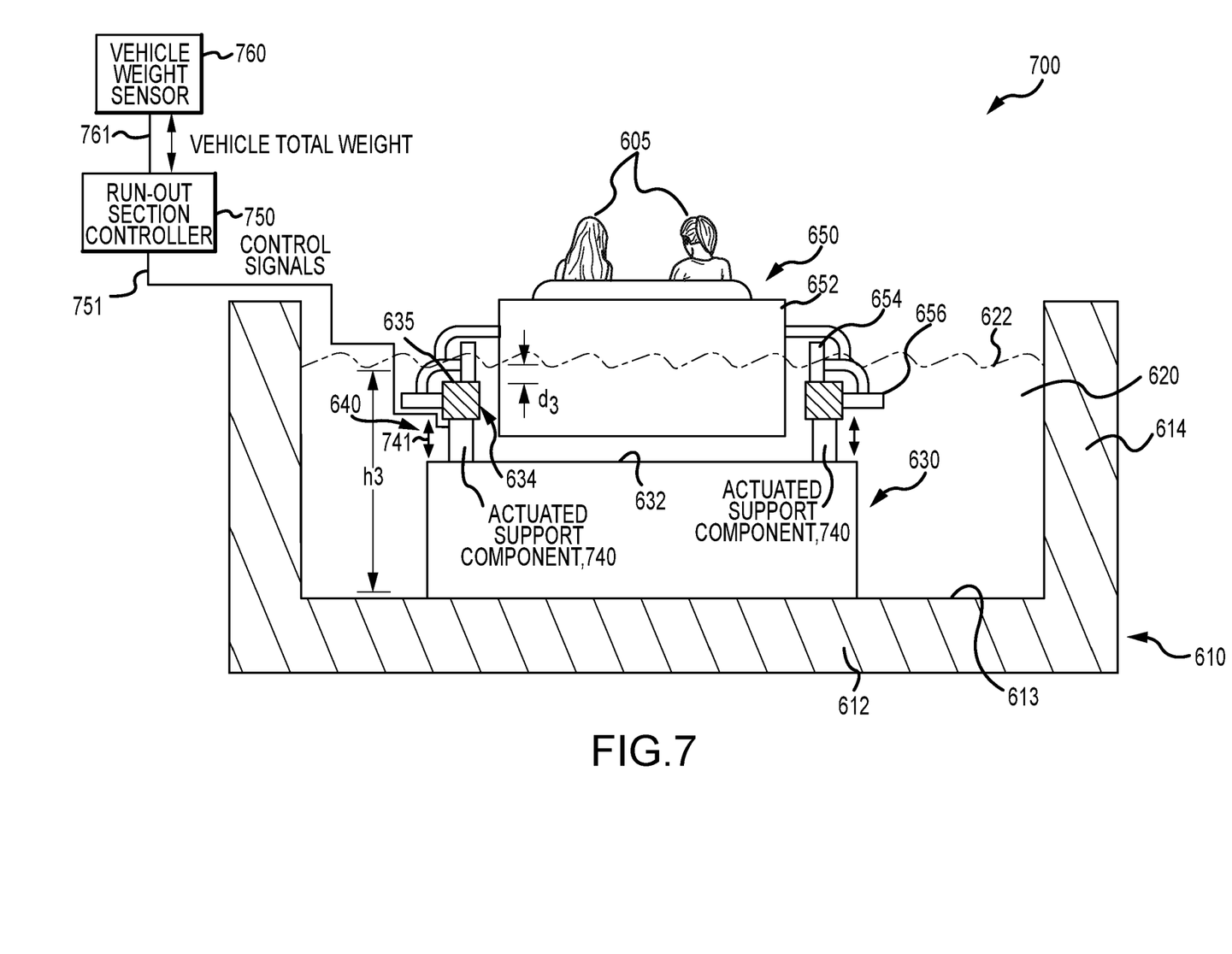
FIG. 7 is a sectional view similar to FIG. 6 showing a run-out section using active positioning of a ride track to provide weight-proportional water drag to vehicles.

While passively varying water drag may be desirable in many applications, water rides or attractions may also utilize run-out sections that provide active variance of the water drag based on vehicle weight. FIG. 7 illustrates a run-out section 700 that includes many of the components of the section 600 but that is adapted for active control over water drag in a manner that is proportional to the weight of the vehicle or boat 650. Specifically, the passive spring members 640 have been replaced with actuated support components 740 that are operable, in response to control signals 751, to vertically move the rails 634 up and down as shown with arrows 741 to achieve a water depth, $d_3$, above the rails 634 to achieve a water drag that is proportional to the total weight of the vehicle 650. For example, the actuated support component 740 may include one or more electric motors that are configured to drive one or more gears to set the height, $h_3$, of the top surface 635 of the rail 634, and, hence, to set the water depth, $d_3$, to provide a desired water drag on the vehicle 650. The run-out section 700 (or a water ride or attraction with such the section or assembly 700) includes a run-out controller 750 configured for generating the control signals 751 to initiate and/or control movement 741 (e.g., downward from a nominal height or position of the rail 634) that is proportional or based on the total weight of each vehicle 650 that travels through the run-out section 700.

In this regard, the run-out section or assembly 700 (or water ride or attraction with section 700) includes a vehicle weight sensor 760 that functions to determine and/or sense the total weight of the vehicle 650 at a point in the water ride or attraction that is upstream of the actuated support element 740 and, often, upstream of the pool/flume 610 (such as in or near an exit of a loading station for the water ride/attraction with the section 700). It may include a scale or similar device provided on a track or its rails or use other techniques well-known in the arts for sensing or determining the vehicle's total weight after it is loaded with passengers 605. The sensor 760 provides a communication or signal 761 indicative of the vehicle total weight to the run-out section controller (e.g., via wired or wireless communications), and the run-out section controller 750 processes the signal and/or the vehicle total weight to determine a desired amount of downward movement 741 and, based on this determination, to transmit the control signals 751 to operate the actuated support elements. Note, the magnitude of the movement 741 may vary along the length of the track in the pool/flume 610 to set the water drag to be the same or differ along the direction of travel (e.g., the water drag may initially be set lower as a vehicle enters the water 620 of the pool 610 and then increase nearer to an outlet of the run-out section 700 or vice versa to achieve desired ride experiences).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A park ride providing water-based braking of vehicles based on vehicle weight, comprising:
    a vehicle configured for receiving one or more passengers;
    a track with a drop section and a run-out section, wherein the track defines a ride path for the vehicle through the park ride first through the drop section and second through the run-out section; and
    a pool with a base and sidewalls defining a space for receiving water,
    wherein the track in the run-out section includes at least one rail extending a distance through the pool along a direction of travel for the vehicle,
    wherein the vehicle includes rotatable wheels engaging a contact surface of the at least one rail when the vehicle travels through the run-out section, and
    wherein the run-out section comprises means for adjusting, in a manner proportional to a total weight of the vehicle, a height of the contact surface of the at least one rail relative to the base of the pool to set a depth of the water applying water drag to the vehicle.

2. The park ride of claim 1, wherein the means for adjusting comprises a plurality of actuatable support components supporting the at least one rail, a run-out section controller transmitting control signals to initiate operation of the plurality of actuatable support components to vertically move the at least one rail to set the height of the contact surface, and a vehicle weight sensor sensing the total weight of the vehicle and wherein the run-out section controller generates the control signals based on the total weight sensed by the vehicle weight sensor.

3. The park ride of claim 1, wherein the means for adjusting adjusts the height of the contact surface passively in response to the vehicle being positioned on the at least one rail in the run-out section.

4. The park ride of claim 3, wherein the means for adjusting comprises a plurality of spring members disposed between vertical track supports in the pool and the at least one rail.

5. The park ride of claim 4, wherein the spring members are configured to have one or more spring rates providing the adjusting of the height of the top surface in the manner proportional to the total weight of the passenger vehicle.

6. The park ride of claim 5, wherein the water drag applied in the manner proportional to the total weight is within a predefined range to provide a deceleration rate in a predefined range and wherein the deceleration rate is substantially equal for the vehicle over a range of values for the total weight.

7. The park ride of claim 4, wherein the spring members each comprises a metal coil spring or a gas shock.

8. The park ride of claim 1, wherein the height is set to a nominal height when the vehicle is unloaded and wherein the depth of the water with the contact surface of the at least one rail at the nominal height provides a magnitude of the water drag to achieve at least a predefined minimum amount of deceleration of the vehicle in the run-out section.

9. The park ride of claim 8, wherein the height is set to a minimum height when the vehicle is loaded with a predefined maximum load and wherein the depth of the water with the contact surface of the at least one rail at the minimum height provides a magnitude of the water drag to achieve at least the predefined minimum amount of deceleration of the vehicle in the run-out section.

10. A park ride providing water-based braking of vehicles based on vehicle weight, comprising:
a passenger vehicle comprising a body adapted to receive passengers;
a flume structure;
water in the flume structure;
rails extending along a length of the flume structure, wherein the rails include a surface for mating with wheels coupled to the body of the passenger vehicle and wherein the surface is positioned at a depth below an upper surface of the water in the flume structure;
vertical track supports in the flume structure for supporting the rails; and
one or more spring members each positioned between one of the vertical track supports and one of the rails, whereby the rails are non-statically supported in the flume structure.

11. The park ride of claim 10, wherein the one or more spring members are configured to have spring rates to be compressed a distance that varies proportionately with a total weight of the passenger vehicle.

12. The park ride of claim 11, wherein the spring rates are chosen such that the distance increases the depth to define water drags that vary in magnitude proportionately with the total weight of the passenger vehicle.

13. The park ride of claim 12, wherein the water drags provide a substantially equal rate of deceleration for the passenger vehicle when the total weight is between a weight of the passenger vehicle when unloaded and a weight of the passenger vehicle when loaded to a predefined maximum loading weight of the passengers.

14. The park ride of claim 10, wherein the one or more spring members each comprises a coil spring or a gas shock.

15. A park ride providing water-based braking of vehicles based on vehicle weight, comprising:
a vehicle comprising a body adapted to receive passengers, wherein the vehicle further comprises a set of load wheels coupled to the body;
a pool filled with a water to a depth in a predefined range of depths;
a drop section defining a ride path for the vehicle into an inlet to the pool, wherein the vehicle is accelerated in the drop section due to a drop in elevation along the ride path;
at least one track rail extending along a length of the pool and having a contact surface for mating with the load wheels to vertically support the vehicle; and
a plurality of spring members elastically supporting the at least one track rail in the pool, wherein the spring members are adapted to compress or move proportionately with a total weight of the passenger vehicle to define a depth of the water contacting a front surface of the body as the vehicle travels on the at least one track rail through the pool.

16. The park ride of claim 15, wherein spring members have spring rates adjusting the depth to define water drags applied to the vehicle that vary in magnitude proportionately with the total weight of the vehicle.

17. The park ride of claim 16, wherein the water drags provide a rate of deceleration in a predefined range of acceptable decelerations for vehicles in the pool downstream of the drop section when the total weight is between an unloaded weight of the vehicle and a maximum weight of the vehicle in the park ride.

18. The park ride of claim 15, further comprising vertical track supports positioned in the pool and wherein the spring members are each positioned between one of the vertical track supports and the at least one rail.

19. The park ride of claim 15, wherein the spring members each comprise a coil spring or a gas shock.

20. The park ride of claim 15, wherein the spring members each comprise an actuatable support component, wherein the park ride further comprises a controller transmitting control signals to initiate operation of the spring members to vertically move the at least one rail to set the depth of the water providing water drag and also comprises a weight sensor sensing the total weight of the vehicle, and wherein the controller generates the control signals based on the total weight sensed by the weight sensor.

* * * * *